Figure 1:
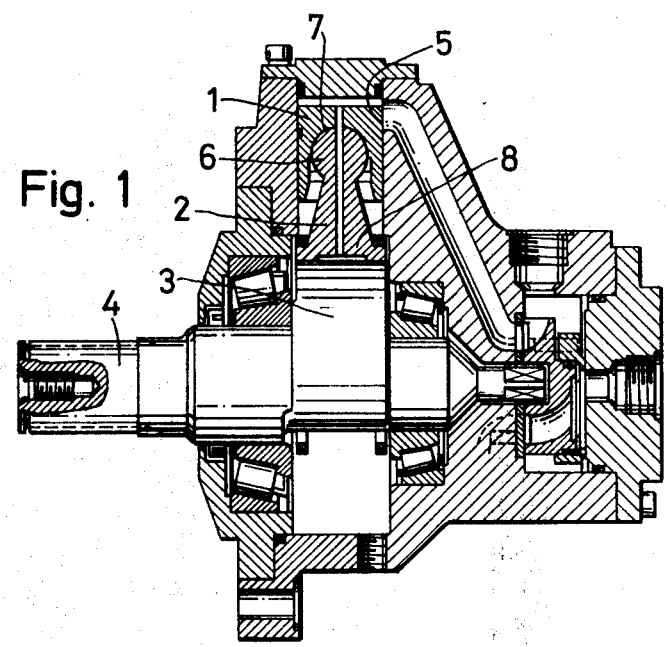

United States Patent [19]
Friedrichs

[11] 3,975,993
[45] Aug. 24, 1976

[54] PISTON-ROD UNIT FOR HYDRAULIC MACHINES

[75] Inventor: Ingo Friedrichs, Karlsrube, Germany

[73] Assignee: Commercial Shearing, Inc., Youngstown, Ohio

[22] Filed: Apr. 22, 1974

[21] Appl. No.: 462,650

[52] U.S. Cl. .................................. 92/129; 92/72; 92/157; 92/159; 92/222; 308/DIG. 8
[51] Int. Cl.² .................. F01B 31/10; F16J 1/20
[58] Field of Search ............. 92/129, 159, 157, 72, 92/58, 222, 187; 91/491, 488; 403/404; 308/DIG. 8, 239; 74/502

[56] References Cited
UNITED STATES PATENTS

| 3,188,973 | 6/1965 | Firth et al. ............................ 92/129 |
| 3,263,623 | 8/1966 | Alexanderson et al. ............... 91/488 |
| 3,280,758 | 10/1966 | Leeming et al. ...................... 91/499 |
| 3,354,786 | 11/1967 | Bedford ................................ 92/157 |
| 3,866,518 | 2/1975 | Miyao et al. ......................... 91/488 |

FOREIGN PATENTS OR APPLICATIONS

| 1,962,546 | 8/1970 | Germany ............................. 91/491 |

*Primary Examiner*—Paul E. Maslousky
*Attorney, Agent, or Firm*—James E. Bryan

[57] ABSTRACT

A motor or processing machine, such as a lowspeed radial piston motor, having a piston with a socket formed therein operatively contacting a ball formed on one end of a piston rod, to form a ball-and-socket joint with articulated movement, and a shoe on the other end of the piston rod, adapted to glide on a rotating element of the machine, such as a crankshaft eccentric, in which the entire piston rod is formed from a bronze-base bearing metal, such as steel bronze. At least the shoe of the piston rod may be coated with a thin, soft run-in layer, such as tin, and a pocket may be formed in the shoe of the piston rod to provide hydrostatic relief.

7 Claims, 2 Drawing Figures

PISTON-ROD UNIT FOR HYDRAULIC MACHINES

The present invention relates to a piston-rod unit, specifically for hydraulic machines and particularly for lowspeed, radial piston motors. It is the object of the present invention to provide a piston rod construction which is particularly safe in operation and resistant to high pressure forces. A simple design is also proposed, with a view to improved manufacturing possibilities.

It has heretofore been known to utilize a solid or unitary piston in low-speed, radial piston machines, but these structures have the disadvantage of overdesigned construction. Further, when the piston axis and, for example, the eccentric axis of a crankshaft or the gliding or sliding surface of a cam are not positioned precisely at a right angle with respect to each other, in all operating positions, damage or destruction will result. Such deviations from a right angle are readily possible, due to manufacturing inaccuracies, inaccurate assembly, wear and tear of machine parts, thermal or mechanical deformations, etc.

It has also been known to employ pistons connected to a piston rod by a piston pin, but these structures, likewise, have the disadvantage of over-designed construction. In addition, when the piston axis and the piston pin axis are not positioned precisely at a right angle with respect to one another and, when the piston pin axis is not positioned precisely parallel, for example, to the eccentric axis of the crankshaft or the gliding or sliding surface of a cam, damage or destruction of the motor may, likewise, occur quite readily, for the reasons mentioned above.

It is further known to connect a piston and piston rod by means of a ball-and-socket joint, in which case the spherical segment, socket or cup of the piston and the sphere or ball of the piston rod consist of iron or steel and may be completely or partially hardened in each case. Disadvantageous in these cases are the facts that:

a. at high simultaneously-acting pressures during the supply and discharge of the pressure medium, the ball-and-socket joint tends to seize or weld and b. an additional bearing or contact of the piston rod shoe becomes necessary, for example, on the crankshaft eccentric, by providing either an additional friction bearing or a piston rod shoe made of antifriction bearing material.

It is also known to provide an insert of friction bearing material in the socket or cup of the piston and to coat the piston rod shoes with friction bearing material. However, such construction involves considerable expenditures and includes additional structural elements which are susceptible to breakdown.

It is the object of the present invention to eliminate the disadvantages set forth hereinabove and to provide a piston rod construction, of the type referred to herein, in which, by simple means, a design or construction that is resistant to high pressures and free from over-design (particularly a freely adjusting design or construction) and which, in a hydraulic machine, is adapted to simultaneously absorb high pressures both at the supply side and also at the discharge side of the pressure medium results.

In accordance with the present invention, a conventional piston is provided, for example, from steel or iron, having spherical segment or socket in which a conventional piston rod is engaged which is formed as a single or unitary piece made completely of friction bearing material having a bronze base. As a result, friction bearing surfaces are created both at that end of the rod carrying the sphere or ball and at that end of the rod carrying the shoe without the requirement of additional expenditures or structural parts or elements susceptible to breakdown. The entire piston-rod unit thus becomes high-pressure-resistant and requires a minimum of parts.

As previously pointed out, prior art hydraulic systems generally utilize spherical segments or sockets of friction bearing materials and spheres or balls of steel or iron. In direct contrast to this general practice of those skilled in this art, it has been found possible in accordance with the present invention to position a friction bearing sphere or ball having a heat expansion quotient higher than steel in a spherical steel indentation or socket. The hydraulic pressures, customary in present day systems, result in high forces being exerted on the piston, whereupon high area or surface pressures are generated in the sphere or ball. In conjunction with the gliding or sliding movement between the sphere or ball and spherical segment or socket, much heat is generated which builds up, particularly in the sphere ball of the piston rod, thereby giving rise to further expansion.

However, the inventive piston-rod unit may be provided and arranged structurally in a manner such that the sphere or ball expansion may take place freely within the entire ranges of speed, pressure and temperature encountered without leading to damage or destruction of the ball-and-socket joint. For this reason, it is necessary to coordinate, in a conventional manner, the play between the sphere or ball and the spherical segment or socket, the preferably, slightly conical construction or design of the spherical segment or socket within which the sphere or ball of the piston rod is positioned, the elastic deformability of the piston and piston rod sphere or ball, etc.

Figure 2:
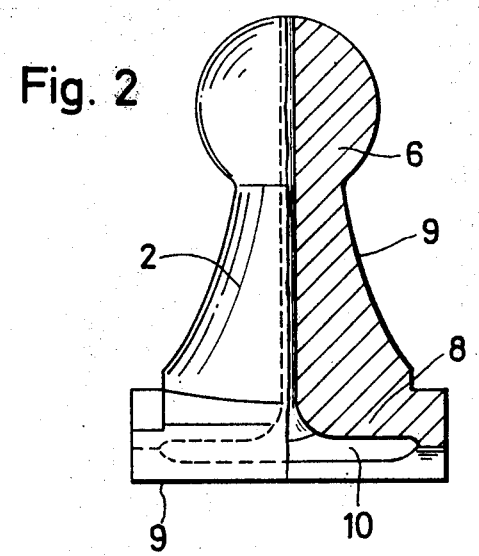

Several embodiments of the present invention will now be described in further detail in conjunction with the accompanying drawings, wherein:

FIG. 1 shows a cross-sectional view of a lowspeed radial piston motor exemplifying one way of carrying out the inventive concept, and FIG. 2 shows a partial cross-sectional view of a piston rod exemplifying a further embodiment according to the present invention.

When pressurized oil is introduced through an oil connection, the piston 1 is placed under pressure, the piston 1 transfers the force being produced to the piston rod 2 which, in turn, presses laterally against the crankshaft eccentric 3, thereby producing a torque or rotary force on the crankshaft 4. When the crankshaft 4 rotates, the piston glides in the cylindrical bore 5, the piston rod sphere or ball 6 glides in the spherical segment or socket 7 of the piston and the guide or crosshead shoe 8 of the piston rod glides on the crankshaft eccentric 3.

If, as a result of manufacturing tolerances, angular play, housing deformations, etc., the crankshaft becomes angularly deflected, the piston rod 2 is thus adapted to yield laterally so that no edge or side pressures, that might damage or destroy the piston-rod unit, can arise. The piston rod shoe 8 and the crankshaft eccentric 3 represent a friction or sliding bearing with respect to each other, and for this reason, at that point, vis-a-vis the crankshaft made from steel, a friction or sliding bearing material is employed on this end of the piston rod. The spherical segment or socket 7 of the piston 1 and the sphere or ball 6 of the piston rod 2 also represent a friction or sliding bearing with respect to each other and for this reason a friction or sliding bearing material is employed on this end of the sphere or ball. Accordingly, a piston rod is provided consisting completely of friction or sliding bearing material.

Having thus taken the inventive step, contrary to the practices of those skilled in this field, of employing friction or sliding bearing material on the sphere or ball of the piston rod, even for such highly charged and large-size ball-and-socket joints as are employed in radial piston machines, a further inventive step was taken by manufacturing the entire piston rod from friction or sliding material and, accordingly, as a single or unitary piece, thereby readily providing, at the same time, two friction or sliding bearing areas. As a result thereof, both the gliding or sliding function at the ball-and-socket joint and at the shoe and the requirement for a free adjustability of the piston rod are effectively and successfully met. This is accomplished by very simple means, means that are substantially more simple than those known heretofore, so that the ultimate result is not only more favorable manufacturing costs but also a reduced loss quota, since a smaller number of stressed elements are present and the heat conduction is better through the integrally made friction or sliding bearing piston rod than is the case in the prior art constructions, so that the thermal load on the ball-and-socket joint is also lower than in known constructions. This is of importance, particularly at higher outputs and in motor operations with simultaneously high feed and discharge pressures, such as, for example, in series arrangements of motors.

In summation, there results a cheaper and operationally more appropriate or suitable total construction of the piston-rod units together with an increased load or carrying capacity, while, on the other hand, producing no known disadvantages.

Possibilities of modifying the present invention are produced by making the friction or sliding bearing material of the piston rod of a tough material (bronze), whereupon a lighter piston rod construction is made possible due to the higher material rigidity. However, such friction or sliding bearing materials have a relatively unfavorable run-in behavior. This disadvantage is obviated, according to a further embodiment of the present invention, by coating the piston rod with a thin and soft run-in layer 9, which may be, for example, a layer of tin, white metal, or the like, having a thickness of 1 to 5$\mu$m, and which is, for example, galvanically applied.

Further possibilities of modifying the structure of the present invention are provided, for purposes of coordination with optimal operating conditions, by hydrostatically relieving the piston rod, i.e. providing at least one oil pocket 10, at the end of the rod adjacent the sliding or gliding piston rod shoe, into which pressurized oil is fed. As a result thereof, the piston rod "swims" constantly on an oil film and produces a relatively small amount of friction.

Further possibilities of modifying the present invention are produced by flattening the piston rod sphere at the upper end, in order to allow the passage of a sufficient amount of lubricant to the piston rod shoe, even in case of deflection of the piston rod. For the same purpose, the piston may have a recess, bore or groove within the region of its axis and similar recesses in the bottom of the spherical segment, socket or cap.

In order to allow for pump operation of the machines, it is also possible to hold the piston and piston rod together, possibly by means of a divided restoring or pullback ring, the latter being secured, for example, by means of a snap ring (Seeger-Ring).

It will be obvious to those skilled in the art that many modifications may be made within the scope of the present invention without departing from the spirit thereof, and the invention includes all such modifications.

What is claimed is:

1. In a motor or processing machine having a piston with a socket formed therein operatively contacting a ball formed on one end of a piston rod, to form a ball-and-socket joint with articulated movement, and a shoe on the other end of said piston rod, adapted to glide on a rotating element of said machine, the improvement comprising forming the entire piston rod of a bronze-base bearing metal.

2. A machine in accordance with claim 1 wherein said machine is a low-speed radial piston motor.

3. A machine in accordance with claim 1 wherein the rotating element of the machine is a crankshaft eccentric.

4. A machine in accordance with claim 1 wherein the bearing metal is a tough bronze.

5. A machine in accordance with claim 4 wherein the tough bronze is steel bronze.

6. A machine in accordance with claim 1 wherein at least the shoe of the connecting rod is coated with a thin, soft run-in layer.

7. A machine in accordance with claim 1 wherein the shoe has formed therein a pocket adapted to provide hydrostatic relief.

* * * * *